United States Patent [19]

Dickinson et al.

[11] 4,059,750
[45] Nov. 22, 1977

[54] GENERAL PURPOSE CALCULATOR HAVING SELECTIVE DATA STORAGE, DATA CONVERSION AND TIME-KEEPING CAPABILITIES

[75] Inventors: Peter D. Dickinson, Monte Sereno; Thomas E. Osborne, San Francisco; France Rode; Allen J. Baum, both of Los Altos, all of Calif.

[73] Assignee: Hewlett-Packard Company, Palo Alto, Calif.

[21] Appl. No.: 566,143

[22] Filed: Apr. 8, 1975

Related U.S. Application Data

[63] Continuation of Ser. No. 364,570, May 29, 1973, abandoned.

[51] Int. Cl.$^2$ ............................................. G06F 13/00
[52] U.S. Cl. ................................................ 364/715
[58] Field of Search ............... 236/156, 159, 160, 164; 340/172.5

[56] References Cited

U.S. PATENT DOCUMENTS

| | | | |
|---|---|---|---|
| 3,641,329 | 2/1972 | DeSandre et al. | 235/156 |
| 3,762,637 | 10/1973 | Hernandez | 235/156 |
| 3,781,820 | 12/1973 | Cochran et al. | 340/172.5 |
| 3,863,060 | 1/1975 | Rode et al. | 235/156 |

*Primary Examiner*—David H. Malzahn
*Attorney, Agent, or Firm*—F. D. LaRiviere

[57] ABSTRACT

A battery-powered hand-held calculator for performing arithmetic, trigonometric, and logarithmic functions and displaying the results thereof is provided with the capability of automatically storing the last displayed number in an auxiliary storage register whenever the next succeeding function to be performed would destroy that number. That number may be recalled fom the auxiliary storage register by simply depressing a prefix key and a Last-X function key.

8 Claims, 2 Drawing Figures

GENERAL PURPOSE CALCULATOR HAVING SELECTIVE DATA STORAGE, DATA CONVERSION AND TIME-KEEPING CAPABILITIES

CROSS REFERENCE TO RELATED APPLICATION

This is a continuation of application Ser. No. 364,570 filed May 29, 1973, now abandoned. Allowed U.S. application Ser. No. 566,144, now U.S. Pat. No. 4,001,569 and also a division of U.S. Patent Application Ser. No. 364,570, is hereby incorporated by reference as amended as if fully set forth herein.

BACKGROUND AND SUMMARY OF THE INVENTION

Calculators using delay line memories and serial data processing are well known in the art, as shown by U.S. Pat. No. 3,328,763 granted to H. M. Rathburn et al. While these calculators can perform some complex calculations involving more than one mathematical function or operation, several, even redundant, key strokes are usually required. For example, to multiply sine X times cosine X, the argument X must be entered into prior art calculators twice. A calculator constructed according to the present invention reduces the number of key strokes required in many calculations by including a capability to readily recall the last number (Last X) utilized in an immediately preceding calculation or the result of such a calculation if that result would be destroyed by the next calculation to be performed by the calculator.

DESCRIPTION OF THE DRAWINGS

FIG. 32 is a flow diagram of the last X function of the calculator of FIGS. 1 and 2.

FIGS. 3–31 inclusive and FIGS. 33–37 inclusive may be found in the above incorporated allowed U.S. patent application.

Refer to allowed U.S. Patent Application Ser. No. 566,144.

DESCRIPTION OF THE PREFERRED EMBODIMENT

Figure 1:
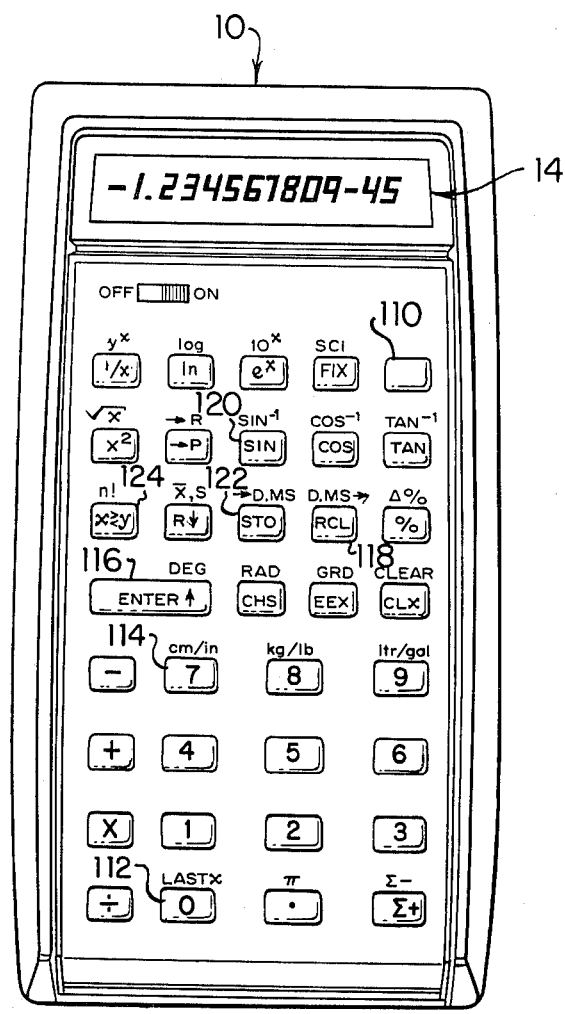
FIG. 1 is a top view of a scientific calculator according to the preferrred embodiment of the invention.
Figure 2:
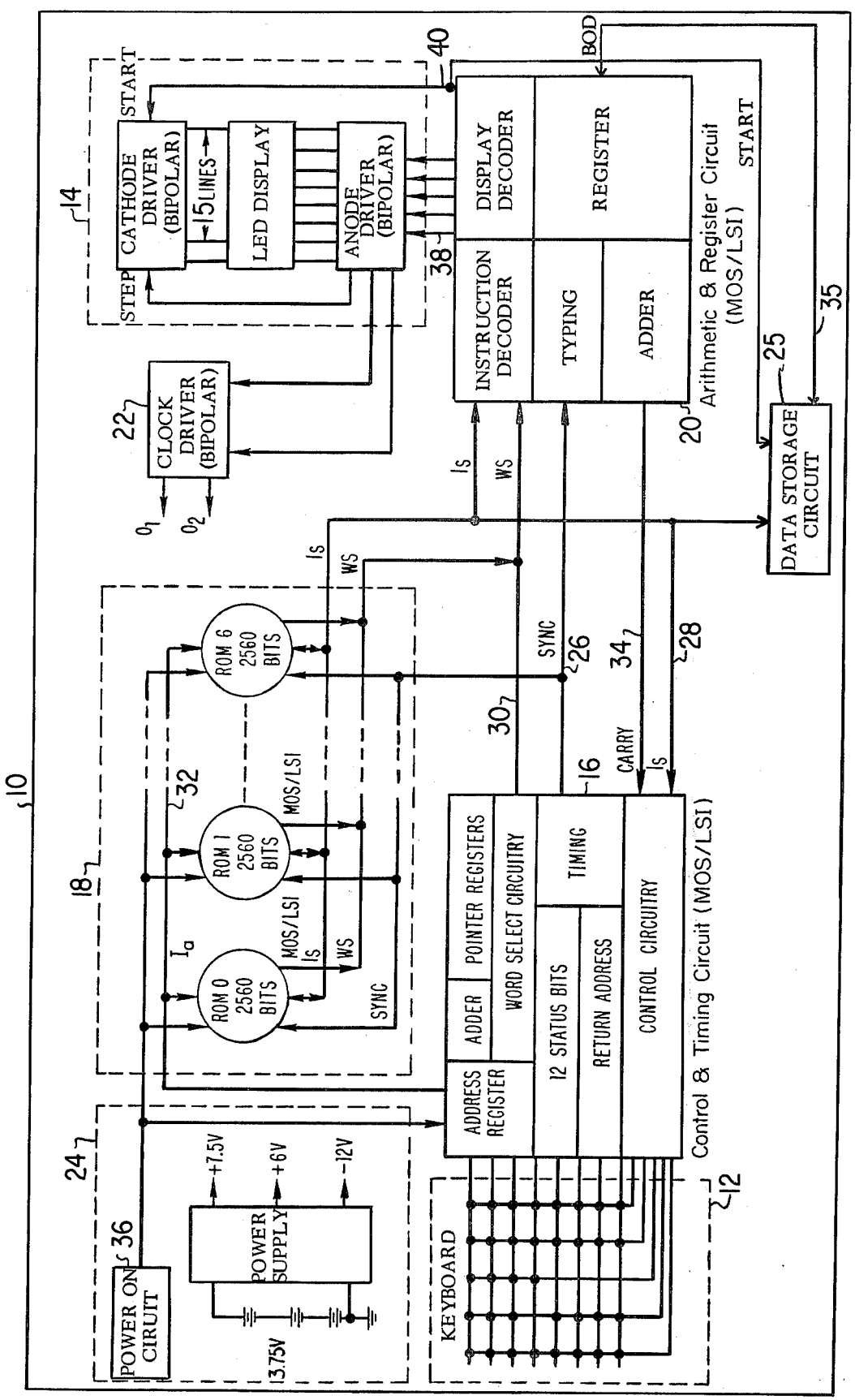
FIG. 2 is a block diagram of the calculator of FIG. 1.

Referring now to FIGS. 1, 2, and 32, a calculator according to the present invention includes a Last-X function which automatically stores the currently displayed number (for example, the last number entered from keyboard input unit 12 or the result of the last function performed by the calculator) in a Last-X shift register of auxiliary data storage circuit 25 whenever the next function to be performed by the calculator would destroy the currently displayed number. That stored number may then be immediately recalled and displayed by simply pressing a prefix key 110 and a Last-X key 112 of the keyboard input unit.

In order to perform this Last-X function, a Last-X subroutine is stored in ROM's 3 and 6, as shown in the detailed listing given below for those ROM's. In ROM 3 this subroutine begins on line 4 and ends on line 91, and in ROM 6 begins on line 99 and then jumps to line 165 and continues through line 187 where the subroutine terminates and the recalled number is then displayed. ROM's 3 and 6 are connected by IS instruction line 28 to auxiliary data storage circuit 25 where the Last-X function to be saved is stored. The latter circuit is connected to Start line 40 to synchronize operation of this circuit with the rest of the calculator and is also connected to arithmetic and register circuit 20 by BCD line 35. Referring to FIG. 32, the Last-X subroutine determines whether the currently displayed number would be destroyed by the next function to be performed by the calculator. The number is automatically stored in the Last-X register of auxiliary data storage circuit 25 if the key code of the next key actuated (i.e., the state of the system counter as described above with reference to FIG. 5) corresponds to any key except SCI/FIX, $x\, y$, $R\downarrow$, STO, RCL, ENTER, CHS, EEX, CLX and any numeric key or alternate function associated a numeric key.

The Last-X function is useful for correcting errors, such as pressing the wrong arithmetic operator key or entering the wrong number. For example, suppose one were performing a long calculation where the number 3 must be subtracted from the number 12, but instead of pressing the subtraction key, the division key is pressed and as a result the number 4 appears in the display. This error can be corrected by pressing the prefix key 110 and the Last-X key 112 to recall the number 3; by pressing the multiplication key to reverse the division and cause the number 12 to appear in the display; by again pressing the prefix key 110 and the Last-X key 112, to again recall the number 3 to the display; and, finally, by pressing the subtraction key to accomplish the operation originally intended. The convenience afforded by the Last-X function will be appreciated even more if instead of a single number like 3, the number destroyed by pressing the wrong function key were, for instance, 3.56789. The Last-X function is also useful for calculations involving the same number more than once. For example, sine N is multiplied by cosine N, where N equals 3.15672, by consecutively entering N, pressing the sine key, pressing the prefix key 110 and the Last-X key 112, pressing the cosine key, and pressing the multiplication key to obtain the final result. While the value of N was used twice in this calculation, it was entered into the calculator only once.

We claim:

1. An electronic calculator comprising:
   an input unit including a plurality of manually operable keys having key codes assigned thereto for entering information into, and initiating mathematical operations performed by, the calculator, said plurality of keys including a class of numeric and non-numeric keys having unique key codes assigned thereto;
   a first memory unit coupled to the input unit for storing information received therefrom and for storing results of operations performed by the calculator;
   a second memory unit coupled to the first memory unit for storing information received therefrom;
   a processing unit having arithmetic means coupled to the input and first memory units for executing mathematical operations performed by the calculator employing the information or results stored in the first memory unit and storing the results of executed operations in the first memory unit, and having control means coupled to the input, first and second memory units, said control means being automatically responsive to the key code of an actuated key on the input unit for selectively transferring a copy of the information or results previously stored in the first memory unit to the second memory unit prior to storing information entered or results initiated by the actuated key in the first memory unit when the actuated key is one of said class of keys; and an output display unit coupled to the control means to provide visual display of the information stored in the first memory unit;

the control means also being responsible to the key code of at least one other of the plurality of keys when actuated for selectively transferring a copy of the information entered or results stored in the second memory unit to the first memory unit.

2. An electronic calculator as in claim 1 wherein:

the plurality of manually operable keys includes a command key;

a selected number of the plurality of keys, including some of the class of keys having unique key codes, are manually operable for causing the processing unit to perform a first operation designated by a first legend associated therewith, and are operable with the command key for causing the processing unit to perform a second operation designated by a second legend associated therewith; and the control means is responsive to operation of one of the selected number of keys with the command key for transferring a copy of the information or results stored in the second memory unit to the first memory unit.

3. An electronic calculator as in claim 2 wherein the key, operable with the command key for causing the control means to transfer the information or results stored in the second memory unit to the first memory unit, is one of the plurality of keys operable for entering information into or initiating operations performed by the calculator.

4. An electronic calculator as in claim 3 wherein the key is a numeric key.

5. An electronic calculator as in claim 1 wherein actuation of any one key of the class of keys alters the information stored in the first memory unit.

6. An electronic calculator as in claim 5 wherein actuation of any key other than the class of keys does not alter the information stored in the second memory unit.

7. An electronic calculator as in claim 1 wherein the arithmetic means can alter the information in the first memory unit.

8. An electronic calculator as in claim 7 wherein the processing unit cannot alter information stored in the second memory unit.

* * * * *